(12) United States Patent
Ferro

(10) Patent No.: US 8,676,167 B2
(45) Date of Patent: Mar. 18, 2014

(54) MOBILE STATION WITH VOICE CALL ACKNOWLEDGEMENT AND MISSED CALL SCHEDULING

(75) Inventor: Javier Ferro, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 623 days.

(21) Appl. No.: 12/340,040

(22) Filed: Dec. 19, 2008

(65) Prior Publication Data

US 2010/0159964 A1  Jun. 24, 2010

(51) Int. Cl.
*H04M 1/725* (2006.01)

(52) U.S. Cl.
USPC ........ 455/412.2; 455/415; 455/466; 455/567; 379/93.23; 379/88.19

(58) Field of Classification Search
USPC ........ 455/456.1, 401, 403, 404.1, 404.2, 466, 455/413, 415, 567, 566; 379/93.23, 100.05, 379/210.02, 93.17, 88.19, 88.27
See application file for complete search history.

(56) References Cited

U.S. PATENT DOCUMENTS

| 5,930,352 | A | 7/1999 | Hiraiwa |
| 6,768,789 | B1 | 7/2004 | Wilk |
| 7,330,721 | B2 * | 2/2008 | Bhatia et al. ............... 455/422.1 |
| 2001/0028709 | A1 | 10/2001 | Makela et al. |
| 2001/0029194 | A1 * | 10/2001 | Ketola et al. ................. 455/567 |
| 2003/0198324 | A1 * | 10/2003 | Chang et al. ............... 379/93.23 |
| 2004/0203794 | A1 | 10/2004 | Brown et al. |
| 2005/0096023 | A1 | 5/2005 | Moore |
| 2007/0010292 | A1 | 1/2007 | Vetelainen et al. |
| 2010/0086112 | A1 * | 4/2010 | Jiang et al. ................. 379/93.23 |

FOREIGN PATENT DOCUMENTS

EP    1694039    8/2006

OTHER PUBLICATIONS

International Search Report and Written Opinion of the International Searching Authority issued in International Patent Application No. PCT/US2009/068792, mailed Mar. 1, 2010.

* cited by examiner

*Primary Examiner* — Ajit Patel

(57) ABSTRACT

A communication station has a circuit that receives an incoming voice call from a calling party, and an acknowledgement mechanism that produces an acknowledgement message sent to the calling party in response to the incoming call if a user of the communication station does not answer the call. In the examples, the communication station sends short message service (SMS) or multimedia message service (MMS) acknowledgement message to the calling party. Also, a scheduling mechanism may be provided for adding a calendar entry to a calendar implemented in the communication station so as to remind the user about the acknowledged incoming call.

17 Claims, 2 Drawing Sheets

MOBILE STATION WITH VOICE CALL ACKNOWLEDGEMENT AND MISSED CALL SCHEDULING

TECHNICAL FIELD

The present subject matter relates to techniques and equipment to facilitate communication with a calling party when a called party does not answer an incoming voice call.

BACKGROUND

Currently, a mobile station that provides voice communications has a call waiting feature that allows a user engaged in a telephone call to respond to another incoming voice call by suspending the current telephone call and switching to the new call. Typically, this can be done by pushing the flash button on a keypad of the mobile station. For important calls that can't be interrupted, the user can temporarily disable call waiting by pressing an appropriate key before placing the call. However, in this case the user may receive no information that a received call was missed.

If the user does not disable the call waiting function but simply ignores the new call during an active voice session, the calling party will receive no feedback as to whether the called party is aware of the call, and no information about availability of the called party. Similarly, if the called party is engaged in a data communication session or is busy and cannot answer the call, no feedback will be provided to the calling party.

Hence, the need still exists for a more effective technique to handle incoming voice calls when a called party cannot answer the call. In particular, there is a need to provide a communication station with a mechanism that would enable a called party to provide a desired feedback to a calling party, when the called party cannot answer an incoming voice call.

SUMMARY

The teachings herein provide an effective technique for handling incoming voice calls in a communication station, for example, which will allow a called party to provide a near real-time feedback to a calling party when the called party is not able or willing to answer a call.

An exemplary method provides communication through a communication network. In response to receiving an incoming voice call from a calling party, a called party is notified about the call. If the called party does not answer the call, an acknowledgement message is sent to the calling party, The method may be enhanced through inclusion of further steps. In one such further example, a reminder is scheduled for the called party to return the call in a predetermined time period after the acknowledgement message is sent. In particular, a calendar entry with data representing the acknowledged call may be added to a calendar of the called party's communication station.

The method may be implemented for communications through a wireless mobile communication network. In this case, the acknowledgement message may include a short message service (SMS) message or a multimedia message service (MMS) message sent from the called party to the calling party.

In response to the incoming voice call, the calling party may be identified. The acknowledgement message may include a message pre-set for a particular calling party.

Aspects of the technology discussed in more detail below may also take the form of a program product, such as an article of manufacture. Such an article comprises a machine readable storage medium; and executable code for a mobile station embodied in the medium. Execution of the code by a processor causes the mobile station to implement functions of the mobile station.

An example of one such article causes the mobile station to implement functions including providing a notification signal to a user of the mobile station in response to an incoming voice call from a calling party. If the user does not answer the call, an acknowledgement message is produced for sending to the calling party.

In one example of such article, the function of producing the acknowledgement message is executed automatically if the user does not answer the call.

In another example, the function of producing the acknowledgement message is executed in response to an operation performed by the user of the mobile station. Such article may cause the mobile station to designate a soft key as an input for entering a command from the user to send the acknowledgement message.

In a further example of such article, the function of producing the acknowledgement message includes generation of an SMS or MMS message to be sent by the mobile station to the calling party.

Another example of one such article causes the mobile station to implement functions including identifying the calling party, selecting a pre-set message corresponding to the calling party, and sending the pre-set message to the calling party.

A further example of one such article causes the mobile station to implement the function of scheduling a reminder notification to the user of the mobile station regarding the calling party if the user does not answer the call. The function of scheduling may comprise adding a calendar entry to a calendar implemented in the mobile station.

Another aspect of the subject matter discussed below involves a communication station for providing voice communications that comprises a receiving circuit for receiving an incoming voice call from a calling party, and an acknowledgement mechanism for producing an acknowledgement message sent to the calling party in response to the incoming call if a user of the communication station does not answer the call. For instance, the acknowledgement mechanism may be configured for sending a data message to the calling party.

In one example, the communication station further comprises a scheduling mechanism responsive to the incoming voice call for adding a calendar entry to a calendar in the communication station so as to remind the user about the incoming call in a predetermined time period after receiving the incoming call.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
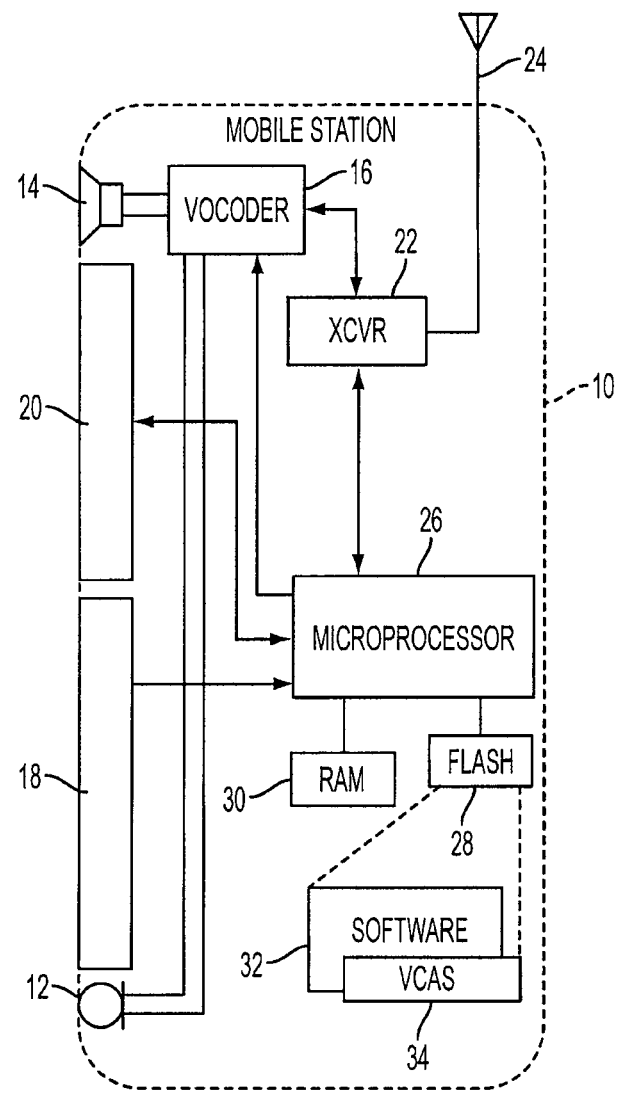
FIG. 1 is a simplified functional block diagram of a mobile station configured to implement a voice call acknowledgement and scheduling mechanism of the present disclosure.

FIG. 1 is a block diagram illustrating exemplary functional elements of a mobile station that may implement a voice call acknowledgement and scheduling scheme of the present disclosure. Although this example shows a mobile station, one skilled in the art would understand that the voice call acknowledgement and scheduling scheme may be implemented by any communication station capable of receiving an incoming voice calls. For discussion purposes, the diagram uses mobile station 10 as the example for illustration of a possible architecture of a mobile station.

Although the station 10 may be incorporated into a vehicle mounted mobile unit or into another device, such as a portable personal computer or PDA, for discussion purposes the illustration shows the station 10 in the form of a handset. The handset embodiment of the mobile station 10 functions as a normal digital wireless telephone station. For that function, the station 10 includes a microphone 12 for audio signal input and a speaker 14 for audio signal output. The microphone 12 and the speaker 14 connect to voice coding and decoding circuitry (vocoder) 16. For a voice telephone call, for example, the vocoder 16 provides two-way conversion between analog audio signals representing speech or other audio and digital samples at a compressed bit rate compatible with the digital protocol of a respective wireless communication network.

As shown, the digital telephone handset 10 includes a keypad 18 and a display 20, for user input and output purposes. The display 20 for example permits display of short message service (SMS) and/or multimedia message service (MMS) messages, a menu, application screen(s), web pages generated by a client browser program or the like, as well as call related information such as dialed and calling party numbers, etc. The keypad 18 enables input dialing digits for voice and/or data calls (including SMS and MMS destination identifiers/numbers) and generating selection inputs keyed by the user based on the displayed menu. These elements are also used for display of menus and other information to the user and user input of selections, for the applications relating, for example, to handling of incoming voice calls and generating SMS and MMS messages. Of course other user interface elements may be used, such as a stylus and touch sensitive display screen, as in a PDA. Also, the mobile station 10 may include other inputs, such as a digital camera (not shown) for image input purposes.

For digital wireless communications, the handset 10 also includes a digital transceiver (XCVR) 22. The concepts discussed here encompass embodiments of the station 10 utilizing any digital transceivers that conform to current or future developed digital wireless communication standards, such as 1x-EVDO or GPRS, although the XCVR 22 may in addition or instead support other wireless communications. The digital transceiver (XCVR) 22 provides voice communications, attendant signaling, SMS communications over the signaling resources of the airlink as well as packet data communications. The transceiver 22 provides two-way wireless communication of information, such as vocoded speech samples and various digital message information. The transceiver 22 also sends and receives a variety of signaling messages in support of the various services provided by the mobile station 10. The transceiver 22 connects through RF send and receive amplifiers (not separately shown) to an antenna 24. The mobile station 10 may include one or more additional transceivers (not shown) for operation in an analog mode or in accord with an alternative digital standard.

A microprocessor 26 controls all operations of the handset implementation of the mobile station 10. The microprocessor 26 is a programmable device. The mobile station 10 also includes flash type program memory 28 and/or a non-volatile random access memory (RAM) 30, for storing various software routines and mobile configuration settings, such as mobile identification number (MIN), etc. In a present implementation, the program memory 28 stores software 32 such as an operating system, vocoder software, client browser software, device driver software, call processing software and short and multimedia message service software. As discussed more later, the stored software 32 also includes at least one voice call acknowledgement and scheduling (VCAS) application 34 for handling the voice call acknowledgement and scheduling scheme of the present disclosure. The memories 28 and 30 also store data, such as telephone numbers server addresses and data input by the user via the keypad 18, for example, including telephone numbers or other identifiers (IDs) such as caller IDs. The stored data will also include short and multimedia message content as well as addresses and location identifiers used during SMS and MMS message communications.

The mobile station 10 has the capabilities necessary to send and receive SMS and/or MMS messages, that is to say, to send and receive messages that may include any combination of multimedia objects (images, audio, video, rich text, etc). For that purpose, various types of multimedia objects can be input and then stored in one or more of the device memories (additional memories not shown may be provided for additional storage capacity for image files and/or other multimedia content); and various types of multimedia objects can be retrieved from device memory, processed and then presented to the user via appropriate output element(s) of the mobile station 10. For example, text input and output for such messages may be provided via the keypad 18 and the display 20; and audio input and output for such messages may be provided via the vocoder 16 in combination with the microphone 12 and the speaker 14.

As noted, the executable code for the mobile station 10 stored in the flash memory 28 includes at least one VCAS client program 34, for execution by the microprocessor 26 of the mobile station 10. The VCAS application 34 could be written in JAVA or BREW. The application 34 may be initially installed on the mobile stations (e.g. by the device manufacturer) or may be downloaded as an upgrade using known techniques.

When the user activates the mobile station 10 to receive incoming voice calls, it will activate the VCAS application 34 for providing missed voice call acknowledgement and for scheduling reminders relating to missed calls. The structure and operation of the mobile station 10, as outlined above, were described by way of example, only.

Figure 2:
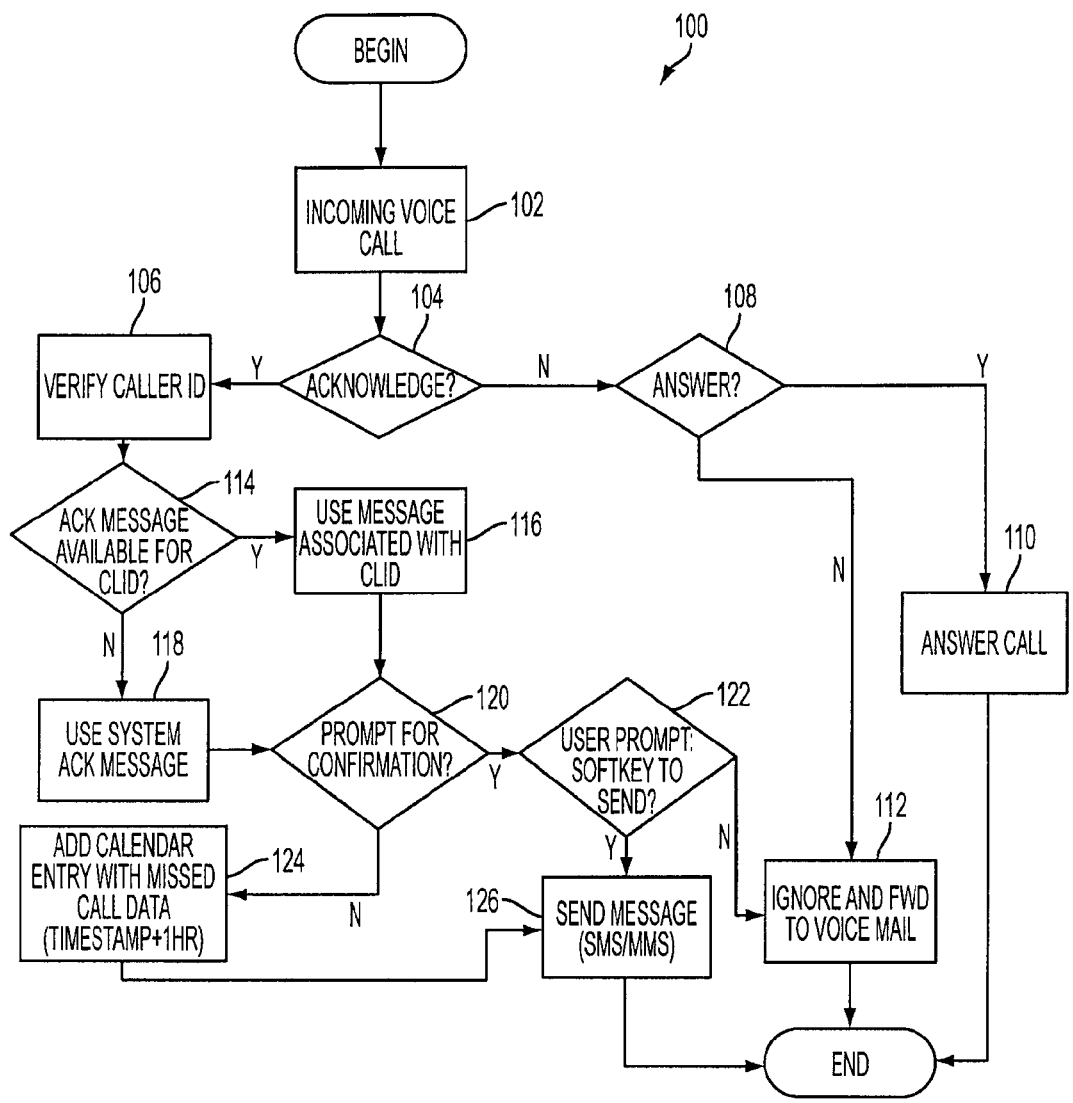
FIG. 2 is a flow diagram illustrating a voice call acknowledgement and scheduling mechanism of the present disclosure.

As illustrated in FIG. 2, the software of the mobile station 10 causes the microprocessor 26 to execute a voice call acknowledgement and scheduling procedure 100 by running the VCAS application 34. In particular, in step 102, incoming voice calls are monitored. When an incoming voice call is detected, the mobile station 10 prompts the user to answer or acknowledge the call. For example, if the user is engaged in an active voice session when an incoming voice call is detected, the user may hear the call waiting tone. If the user chooses to acknowledge the incoming voice call (step 104), the voice call acknowledgement and scheduling procedure 100 may involve verifying caller identification (step 106). The called party may choose to acknowledge the incoming voice call, if it is currently on another voice call and does not want to be disturbed, or if the called party is engaged in a data session and does not want to be disturbed. Alternatively, the incoming voice call may be acknowledged when no voice or data session is active, the mobile station 10 is idle but the user does not want to be disturbed.

If the called party chooses not to acknowledge the incoming voice call, the procedure 100 gives the user a choice (step 108) to answer the call or to ignore it and forward the call to a voice mail (step 112).

The voice call acknowledgement function may be activated automatically upon receiving an incoming voice call while the mobile station 10 is engaged in another voice call or in a data session. Alternatively, the user may activate this function manually by pressing a key on the keypad 18. For example, an option to press a pre-programrned soft key may be presented on the display 20.

As discussed above, when the user chooses to acknowledge an incoming voice call, the caller ID is verified in step 106. The caller ID may be verified based on a telephone service that transmits a caller ID to the called party's equipment. There are two types of caller ID, number only and name plus number. Number only caller ID is called Single Data Message Format (SDMF), which provides the caller's telephone number, the date and time of the call. Name plus number caller ID is called Multiple Data Message Format (MDMF), which in addition to the information provided by SDMF format, can also provide the directory listed name for the particular number.

During the set-up and configuration of the mobile station 10, for a particular caller, the user may enter a custom acknowledgement message or use a message from a pre-populated list of text messages (quick TXT). The quick TXT list may be any list of pre-set or saved SMS or MMS messages. For example, the message "Busy now. I'll call you back soon" may be added to the quick TXT list for using as an acknowledgement message for a particular caller.

The user may link a message from the quick TXT list with a specific entry in the contact list. For example, the user may select a contact "John Doe" in the contact list and designate a newly added entry to the quick TXT list as the acknowledge message for that contact.

Also, the user selects a system-wide quick TXT which is tagged as the system acknowledgement message. This message will be used as an acknowledgement message for a caller that does not have a pre-selected acknowledgement message.

In step 114, the mobile station 10 determines whether a pre-selected acknowledgement message associated with the detected caller ID (CLID) is available. If so, the acknowledgement message associated with that caller is selected (step 116). If a pre-selected acknowledgement message is not available for a particular caller, the system acknowledgement message is used (step 118).

During the set-up and configuration procedure, the user of the mobile station 10 may set an acknowledgement confirmation property that establishes an automatic or manual mode to acknowledge incoming voice calls. For example, if an automatic option is set, the mobile station 10 is enabled to automatically acknowledge each incoming voice call received during active voice and/or data sessions. If a manual option is set, in response to the incoming voice call, the user is presented with a soft key that can be pressed to confirm that an acknowledgement message should be sent.

In step 120, the procedure determines whether an automatic or manual acknowledgement confirmation option is selected. If the manual acknowledgement option is set, the mobile station 10 requests the user to confirm that an acknowledgement message should be sent in response to the detected incoming voice call. For example, a visible prompt is produced on the screen of the display 20 requesting the user to press the soft key in order to send an acknowledgement message (step 122). If the user does not confirm sending the acknowledgement message, the call is forwarded to the user's voice mail.

If the automatic acknowledgement option is selected, a scheduling function may be initiated to automatically send the acknowledgement message and remind the user to return the acknowledged voice call. For example, the mobile station 10 may be provided with a calendar function that enables the user to add entries corresponding to specific events scheduled for particular day and time. At a scheduled time, a visual or sound signal is generated to remind the user about the respective event. Such calendars are common in mobile phones and well known to one skilled in the art.

If the automatic acknowledgement option is set, the mobile station 10 may produce a calendar entry indicating called party identification, and time of the acknowledged voice call (step 124). The calendar entry may be made for a time corresponding to a pre-selected time interval after the incoming voice call is detected. After expiration of this time interval, the calendar function automatically produces a visual or sound signal to remind the called party about the acknowledged voice call.

The acknowledgement message may be sent as an SMS or MMS message produced by the mobile station 10 (step 126). Alternatively, the acknowledgement message may be sent to the calling party using any available data or voice messaging service existing between the mobile station 10 and the calling party, such as an e-mail service or voice mail service.

The acknowledgement message may be sent as an SMS or MMS message produced by the mobile station 10 (step 118). Alternatively, the acknowledgement message may be sent to the calling party using any available data or voice messaging service existing between the mobile station 10 and the calling party, such as an e-mail service or voice mail service.

As shown by the discussion above, a number of aspects of the voice acknowledgement and scheduling procedure rely on programming of the mobile stations. Program aspects of the technology may be thought of as products or articles of manufacture, typically in the form of executable code and/or associated data that is carried on or embodied in a type of machine readable medium, for mobile station execution. Storage media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or affiliate into one or more of the mobile stations. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to storage media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in mobile stations shown in the drawings or in any computer(s) or the like that may be used to supply such programming to the mobile stations for installation and/or upgrade purposes. Volatile storage media include dynamic memory, such as main memory of such a computer platform or of any of the mobile stations. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer or machine readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, an EPROM and an EEPROM, a FLASH-EPROM, any other memory chip or cartridge, a carrier wave transporting data or instructions, cables or links transporting such a carrier wave, or any other medium from which a computer or other machine can read programming code and/or data. Many of these forms of computer readable media may be involved in carrying one or more sequences of one or more coded instructions to a processor for execution for example in a mobile station.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of communication through a communication network, comprising the steps of:
    responsive to an incoming voice call from a calling party, notifying a called party about the call,
    providing the called party with a choice to acknowledge the incoming call by sending an acknowledgement message to the calling party, or to answer the incoming call, and
    if the called party chooses to acknowledge the incoming call instead of answering the incoming call, scheduling a reminder to be provided to the called party to remind the called party about the incoming call at a predetermined time after acknowledging the incoming call, and sending the acknowledgement message to the calling party.

2. The method of claim 1, wherein the step of scheduling includes adding a calendar entry to a calendar of the called party.

3. The method of claim 1, wherein the communication network includes a wireless mobile communication network.

4. The method of claim 3, wherein the acknowledgement message includes a short message service (SMS) message sent from the called party to the calling party.

5. The method of claim 3, wherein the acknowledgement message includes a multimedia message service (MMS) message sent from the called party to the calling party.

6. The method of claim 1, wherein the calling party is identified in response to the incoming voice call.

7. The method of claim 6, wherein the acknowledgement message includes a message pre-set for a particular calling party.

8. An article of manufacture comprising:
    a non-transitory machine readable storage medium; and
    executable code for a mobile station embodied in the medium,
    wherein execution of the code by a processor causes the mobile station to implement functions of the mobile station comprising:
    responsive to an incoming voice call from a calling party, providing a notification signal to a user of the mobile station, and
    providing the user of the mobile station with a choice to acknowledge the incoming call by sending an acknowledgement message to the calling party, or to answer the incoming call,
    if the user chooses to acknowledge the incoming call instead of answering the incoming call, determining identification (ID) information of the calling party, determining whether an acknowledgement message associated with the determined ID information is available, and producing the determined acknowledgement message to be sent to the calling party.

9. The article of manufacture of claim 8, wherein the function of producing the acknowledgement message is executed automatically if the user does not answer the call.

10. The article of manufacture of claim 8, wherein the function of producing the acknowledgement message is executed in response to an operation performed by the user of the mobile station.

11. The article of manufacture of claim 8, wherein the function of producing the acknowledgement message includes generation of a short message service (SMS) message to be sent by the mobile station to the calling party.

12. The article of manufacture of claim 8, wherein the function of producing the acknowledgement message includes generation of a multimedia message service (MMS) message to be sent by the mobile station to the calling party.

13. The article of manufacture of claim 8, wherein the functions of the mobile station implemented upon execution of the code further comprise:
    responsive to the incoming call from the calling party, scheduling a reminder notification to the user of the mobile station regarding the calling party if the user does not answer the call.

14. The article of manufacture of claim 13, wherein the function of scheduling comprises adding a calendar entry to a calendar implemented in the mobile station.

15. The article of manufacture of claim 8, wherein the functions of the mobile station implemented upon execution of the code further comprise:

designating a key in the mobile station as an input for entering a command from the user to send the acknowledgement message.

16. A communication station for providing voice communications comprising:
- a receiving circuit for receiving an incoming voice call from a calling party,
- an acknowledgement mechanism for enabling a user of the communication station to acknowledge the incoming call by sending an acknowledgement message to the calling party, instead of answering the incoming call, and
- a scheduling mechanism configured for adding a calendar entry to a calendar in the communication station if the user chooses to acknowledge the incoming call instead of answering the incoming call, so as to remind the user about the incoming call at a predetermined time after acknowledging the incoming call.

17. The communication station of claim 16, wherein the acknowledgement mechanism is configured for sending the acknowledgement message in a form of a data message to the calling party.

* * * * *